United States Patent [19]

Hajdu et al.

[11] 3,786,430

[45] Jan. 15, 1974

[54] DATA PROCESSING SYSTEM INCLUDING A SMALL AUXILIARY PROCESSOR FOR OVERCOMING THE EFFECTS OF FAULTY HARDWARE

[75] Inventors: Johann Hajdu; Guenter Knauft, both of Boeblingen; Petar Skuin, Magstadt; Edwin Vogt, Boeblingen, all of Germany

[73] Assignee: International Business Machines Corporation, Armonk, N.Y.

[22] Filed: Nov. 15, 1971

[21] Appl. No.: 198,881

[52] U.S. Cl. .......................................... 340/172.5
[51] Int. Cl.... G06f 15/16, G06f 15/20, G06f 11/06
[58] Field of Search .................................. 340/172.5

[56] References Cited

UNITED STATES PATENTS

| | | | |
|---|---|---|---|
| 3,377,623 | 4/1968 | Reut et al. | 340/172.5 |
| 3,408,628 | 10/1968 | Brass et al. | 340/172.5 |
| 3,286,239 | 11/1966 | Thompson et al. | 340/172.5 |
| 3,629,851 | 12/1972 | Werner | 340/172.5 |
| 3,517,171 | 6/1970 | Avizienis | 340/172.5 |
| 3,623,011 | 11/1971 | Brynard, Jr. et al. | 340/172.5 |

*Primary Examiner*—Harvey E. Springborn
*Attorney*—Edward S. Gershuny

[57] ABSTRACT

An electronic data processing system comprising a relatively large main processor, a relatively small auxiliary processor, and a bus system linking both of said processors. The auxiliary processor is linked, via the bus system, to various portions of the main processor including data registers, error checking circuits, and function decoders. If one of the error checking circuits within the main processor detects a machine malfunction, the auxiliary processor will be able, via the bus system, to determine the portion of the main processor in which the malfunction occurred (by detecting which error check circuit detected the malfunction), and to determine the function which the main processor was attempting to perform when the malfunction occurred (by examining the output of the function decoder). The auxiliary processor will then, also via the bus system, address a data register which furnished input data to the failing portion of the main processor and extract the data therefrom; the auxiliary processor will manipulate the data (in accordance with the function defined by the function decoder in the main processor) to produce the result that would have been produced if the malfunction had not occurred (thereby, in effect, simulating the malfunctioning portion of the main processor); and, again via the bus system, the auxiliary processor will transmit the result to a data register within the main processor which accepts output data from said failing portion. The main processor will then be restarted to continue processing.

2 Claims, 9 Drawing Figures

DATA PROCESSING SYSTEM INCLUDING A SMALL AUXILIARY PROCESSOR FOR OVERCOMING THE EFFECTS OF FAULTY HARDWARE

BACKGROUND OF THE INVENTION

This invention relates to an electronic data processing system in which special precautions are taken to detect and process errors occurring in the system.

Electronic data processing systems are nearly all provided with error check circuits for supervising the arithmetic and logical operations carried out in them. Best known in this connection are parity check circuits which generate an additional or parity bit on the basis of a fixed data length. By means of this parity bit the number of bits within this fixed data length is caused to be either even or odd. The parity of the data length can be newly formed from one processing step to the next and be compared to the original one.

However, not all errors detected are caused by defective circuits, which in such cases would be permanent errors. There are many other causes for errors, such as the discharge of high voltages which may lead to faulty pulses on the transfer lines of the system. By means of an operation retry, which is used in such cases in known data processors, the error is eliminated. These so-called intermittent errors, which may also be due to other causes, are generally difficult to localize.

A known method (for example, described in "Proceedings Seminar on Automatic Check Out Technique" BATELLE Institute, Columbus, Ohio, 1962, pp. 52 to 65), by means of which an error routine is invoked, employs a check character pattern source whose information is transferred to the individual elements of a data processor. As long as these elements operate trouble-free, their output signals are exactly known and are stored similar to the information of the check character pattern source. A comparison of the anticipated signal pattern with the actual one available shows which defective circuits caused the respective errors.

In the case of permanent errors (caused, for example, by defective circuits or components) a retry of a faulty function or operation does no longer permit the correct result of such a function or operation being computed, so that the system must be stopped until the defective system components have been repaired by the service personnel.

This entails the disadvantage of valuable machine time being lost, which is particularly disadvantageous when urgent jobs have to be carried out.

As there are special applications of electronic data processing systems, such as space flights, where interruptions would be fatal, it has been proposed that a data processing system be provided which consists of two synchronized data processing units subjecting the input data to the same operational functions and whereby each processing unit comprises a plurality of data sources corresponding to a plurality of data sources in the other processing unit. The two data processing units of this system are connected so that they automatically supervise each other, disconnecting the faulty data processing unit from the system in the case of an error.

At the high degree of reliability of current data processing systems, such a system permits an almost trouble-free operation. From the cost standpoint, however, such a data processing system is highly uneconomical, since it entails twice the normal expenditure for executing jobs.

SUMMARY OF THE INVENTION

Therefore, it is an object of the present invention to avoid the above disadvantages by providing a data processing system operating largely without interruptions, but without requiring twice the normal computing means.

To this end, the electronic data processing system in accordance with a preferred embodiment of the invention is characterized in that a main processing system and an error processing system are linked via a bus system, whereby the error processing system supervises the check circuits of the main processing system by means of an addressing arrangement, identifying, in the case of an error, the corresponding check circuit, taking over the source information from the registers and functional units that contributed to the erroneous operation, storing it and subsequently computing the erroneous function in its processor, transferring the correct result via a selectable transfer system to a result register of the main processing system and, finally, starting the main processing system by setting a switch for the next function to be performed.

In this connection it is essential from the point of view of the invention that the error processing system for computing the result comprises an arithmetic and logical unit which is of a simple, essentially serial design, so that the result is generally computed in several steps.

In accordance with a further advantageous embodiment of the invention the error processing system, prior to computing the result proper, loads the registers and functional units of the main processing system that contributed to the erroneous function with the source information, restarting the main processing system for repeating the erroneous function and computing the result only in the case of a renewed identical error.

In comparison with known data processing systems, the present system permits a largely trouble-free operation at reduced circuit requirements.

The foregoing and other objects, features and advantages of the invention will be apparent from the following more particular description of the invention as illustrated in the accompanying drawings.

GENERAL DESCRIPTION

Figure 1:
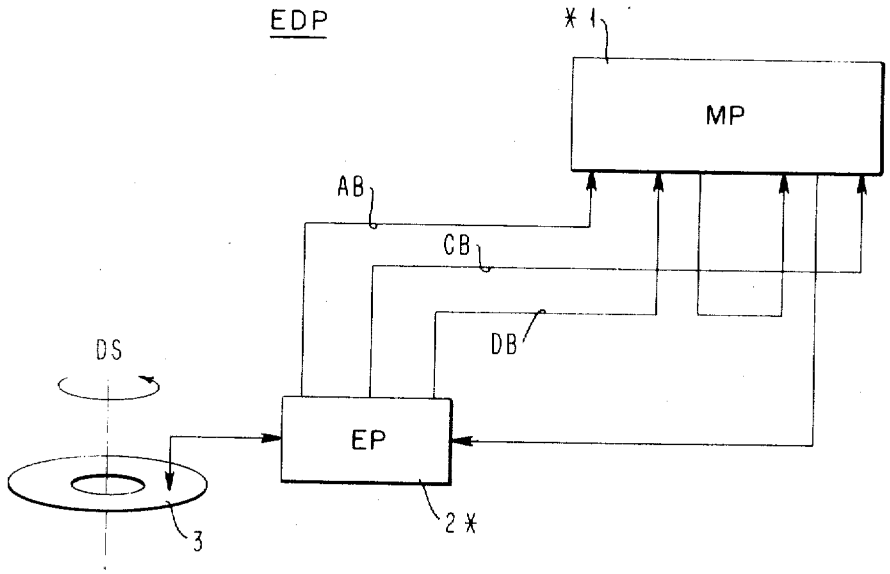
FIG. 1 is a block diagram of the data processing system in accordance with the invention, consisting of the main and the error processing system.

As is well known, the elemental operations performed by typical digital data processors are quite simple in nature and limited in number. Although there may be some variance from system to system, operations which may be performed by the hardware of a data processor will typically include arithmetic operations (for example, adding), logical operations (for example, AND, OR), register-to-register transfers (with or without shifting), and detecting (for example, the presence or absence of data). In most digital computers, various "functions" are performed by performing sequences of one or more simple operations. A typical large, fast (and expensive) computer system will contain a relatively large amount of "hard-wired" operation sequences so that it can rapidly perform a relatively large number of functions. On the other hand, a typical small, slow (and relatively inexpensive) computer will contain a smaller number of hard-wired operational sequences, but will rely upon software and/or "firm ware" (for example, microprogramming) to accomplish complex functions. One example of a function is the multiplication of two numbers. Many large data processing systems contain a multiply unit which comprises circuitry specifically dedicated to the performance of multiplications in an expeditious manner. Such systems typically resond to a MULTIPLY instruction by feeding two operands to the inputs of the multiply unit which, in a relatively short period of time, will then make the desired product available at its output. In other systems, there is no multiply unit and the system will respond to a MULTIPLY instruction by performing repetitive additions in its adder to generate the desired product. Such systems will generally take longer to form the product than will a system which has a dedicated multiply unit. Still another approach to multiplication is found in systems which do not contain a MULTIPLY instruction in their instruction repertoires. In such systems, multiplication is accomplished through programming, for example, by a programmed sequence of ADD instructions. Performing multiplication in this manner will, of course, take an even longer time than those previously discussed. The time consumed in multiplying two numbers would be still further lengthened when using a system which does not contain an adder. In such a system, each addition iteration would typically be performed through the utilization of an "addition table" which is used by the system to "look up" various desired sums. The most important point of this example is that each of the four systems mentioned can perform the identical function (multiplication) although each of the systems will perform at a different speed and varying amounts of programming may be required. In comparing these systems, it should also be noted that the last three systems mentioned, in effect, "simulate" the operation of a "functional unit" (i.e., the multiplication unit) which is present in the first system mentioned; and the last system mentioned, in effect, "simulates" operations performed by a functional unit (i.e., the adder) which is present in the other three systems. Another point which must be appreciated if one is to understand the significance of the invention described and claimed herein is that, in the order in which the systems were mentioned above, each system will generally be substantially less costly than the systems previously mentioned.

As is also well known to those skilled in the art, a typical data processor operates in various ways upon input data in accordance with programmed instructions to achieve a desired result. As is suggested above, the complexity of the data operations can range from the very simple (for example, transfer of data unchanged from one part of the system to another) to the very complex (for example, multiplication of two numbers). It is also quite common that different types of data operations are performed in different physical portions of the machine (for example, many large processors have separate portions of the machine for adding and for multiplying). Each portion of a data processor which operates on data in a predetermined manner to produce a desired result is commonly called a functional unit. The function performed by a functional unit is simply the operation or operations that it performs upon data. A typical data processor also contains various data registers for (at least temporarily) storing data within the processor before or after it has been operated upon by a functional unit. Each functional unit typically receives its input from one or more data registers (a computer memory is often regarded as a large bank of data registers) and transmits its output to one or more data registers. Thus, an alternative definition of the term functional unit is that portion of the data processor through which data are transmitted (with or without change) as the data passes from one register to another. In order to obtain reasonable assurance that the data processor is functioning properly, error checking circuits (usually parity circuits) are usually connected to each register.

FIG. 1 shows an electronic data processing system EDP consisting of a main processing system (MP) 1, which comprises the Input/Output channels and the Input/Output units, and of an error processing system (EP) 2. (The error processing system could also be referred to as a function simulation processing system.) A disk storage (DS)3 containing amongst others the error routine and free storage areas for logging error data is connected to the error processing system 2. Main processing system 1 and error processing system 2 are linked with each other via an address bus AB, a control bus CB and a data bus DB. Bus DB is preferably designed as a ring bus. In addition, an interface is provided for connecting the two systems which are hereafter described in detail.

As has already been mentioned, systems 1 and 2 are not identical but are different autonomous units. The interface permits the error processing system to intercept the function of the main processing system in the case of an error and to compute the correct partial or final result which is subsequently returned to the main processing system. Then main processing system 1 is again restarted by error processing system 2. An example of a system which could be utilized as the main processing system 1 is described in the IBM FIELD ENGINEERING MAINTENANCE DIAGRAMS for the System/360 Model 195 (Volumes 1–4), form numbers SY22-6851, SY22-6852, SY22-6853 and SY22-6854, respectively. An example of a system which could be the error processor 2 is described in IBM FIELD ENGINEERING MAINTENANCE DIAGRAMS for the IBM Model 2020 Processing Unit, form number SY33-1042. The Model 2020 manual was published in 1969, the Model 195 manual was published in 1970.

Thus, error processing system 2 merely carries out (preferably, by low speed simulation) the function of a malfunctioning unit of the main processing system 1. Error processing system 2 is only employed if there are error messages from the main processing system.

Figure 3A:
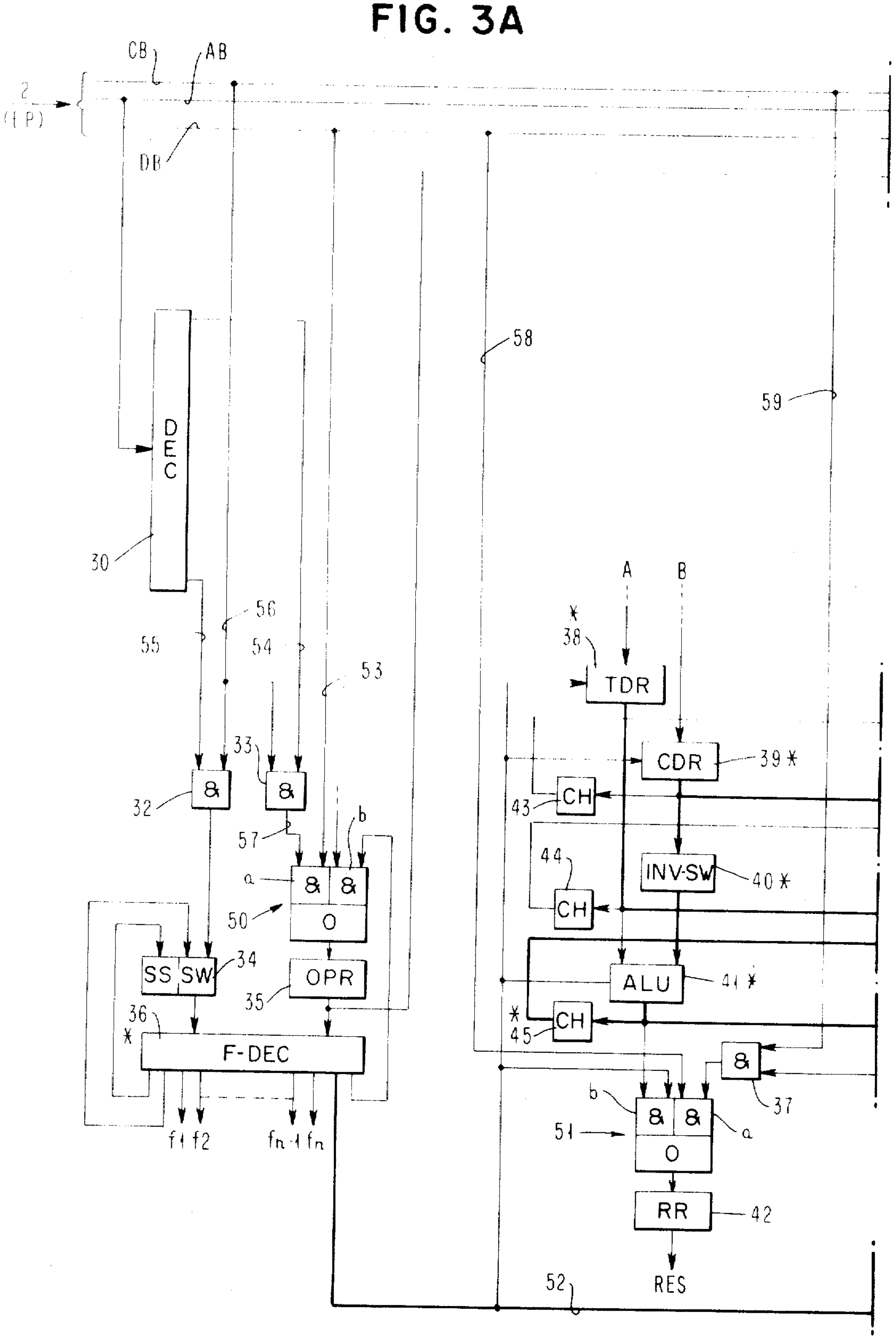
FIG. 3A–5B are representations of the data flow and the controls of the data processing system in accordance with FIG. 1.

The example described hereinafter refers to an error of the arithmetic and logical unit (ALU)41 (FIG. 3A)

which merely affects the AND operation at a particular bit pattern on the input.

An error message resulting, for example, from a parity error which is detected by a parity check circuit causes the error processing system 2 to be activated. This system then has to determine from what part of the main processing system 1 the error message originated, subsequently scanning the essential information sources, such as operation register OPR, TD register TDR and CD register CDR shown in FIG. 3A which may have to do with the error.

As the detected error may be an intermittent one, the main processing system initially tries to eliminate the error by one or several retries. It is only after these operations have been carried out without success that the error processing system is set on. As error processing system 2 knows the erroneous operation and the source data which were subjected to this operation, it computes the correct value in its adder in several steps, since the design of this adder is less elaborate than that of the adder of the main processing system 1. The correct result is then transferred to the main processing system, for example, to result register (RR) 42 as is shown in FIG. 3A.

The current program is then continued by main processing system 1 with the correct result after error processing system 2 has applied a start signal to the main processing system 1. The complete system permits correcting a plurality of errors, with the total processing speed of the system being reduced when errors are to be corrected.

DETAILED DESCRIPTION

As is known, the circuit structure of a data processing system is continuously supervised by means of special check circuits, so that processing errors can be rapidly detected. These error check circuits are generally parity check circuits located on the outputs of larger or smaller functional units and which parity-check the result information obtained in the respective processing step supervised by the check circuit. In this connection attention is drawn to FIG. 3A showing three check circuits 43 to 45, by means of which the information in registers 38 and 39 and in functional unit 41 is checked for the correct parity.

Figure 3B:
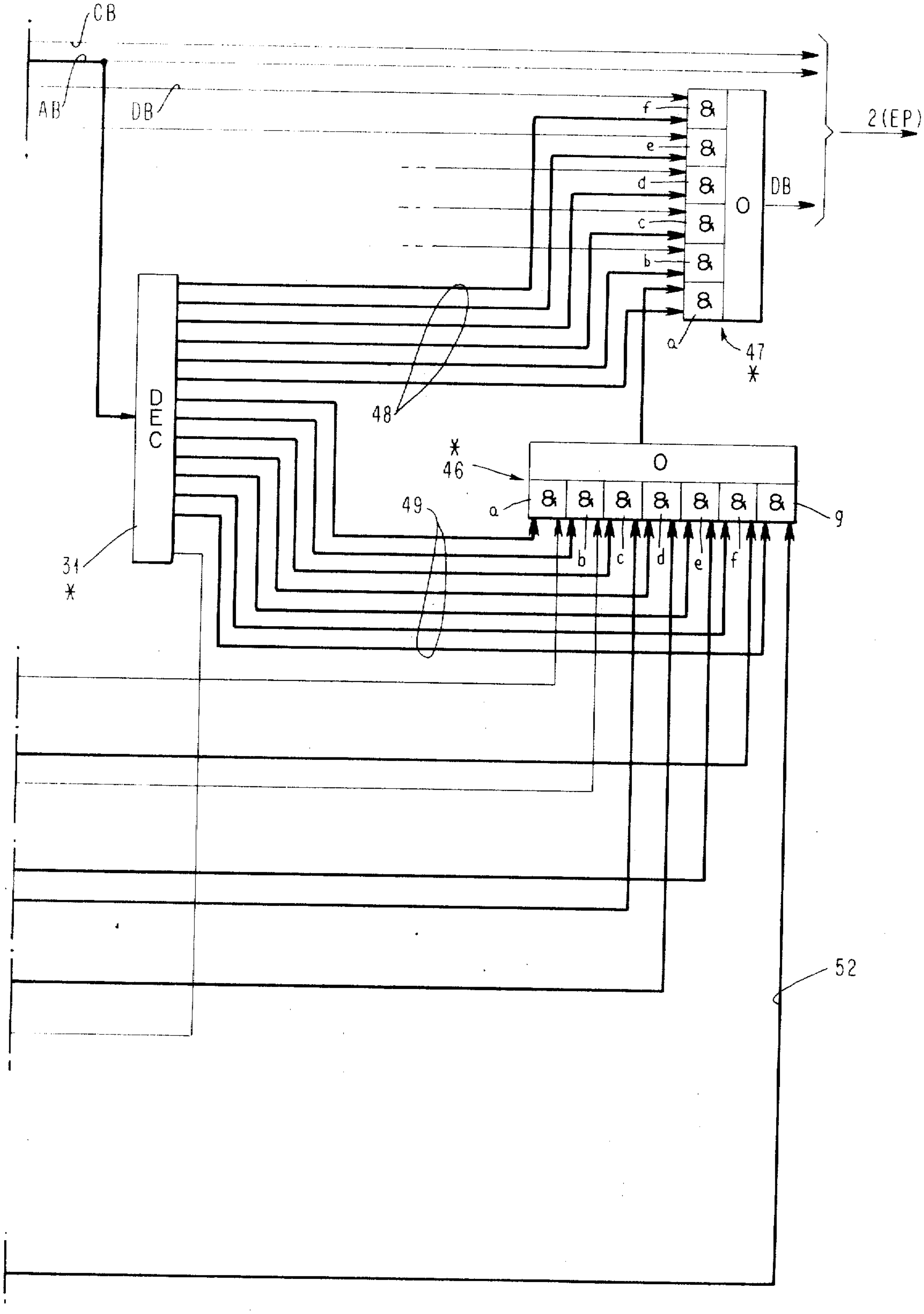

As is shown in FIGS. 1, 3A and 3B, the error processing system (EP) 2 is connected to the main processing system (MP) 1 via a bus system. Via this bus system, error processing system 2 checks at regular intervals the outputs of essentially all check circuits of the main processing system 1. To this end, error processing system 2 utilizes a special addressing method, in that each supervised check circuit is associated with a particular address. In this manner it is possible to centrally address the output of each check circuit by referring to an address permanently associated with it.

Figure 2:
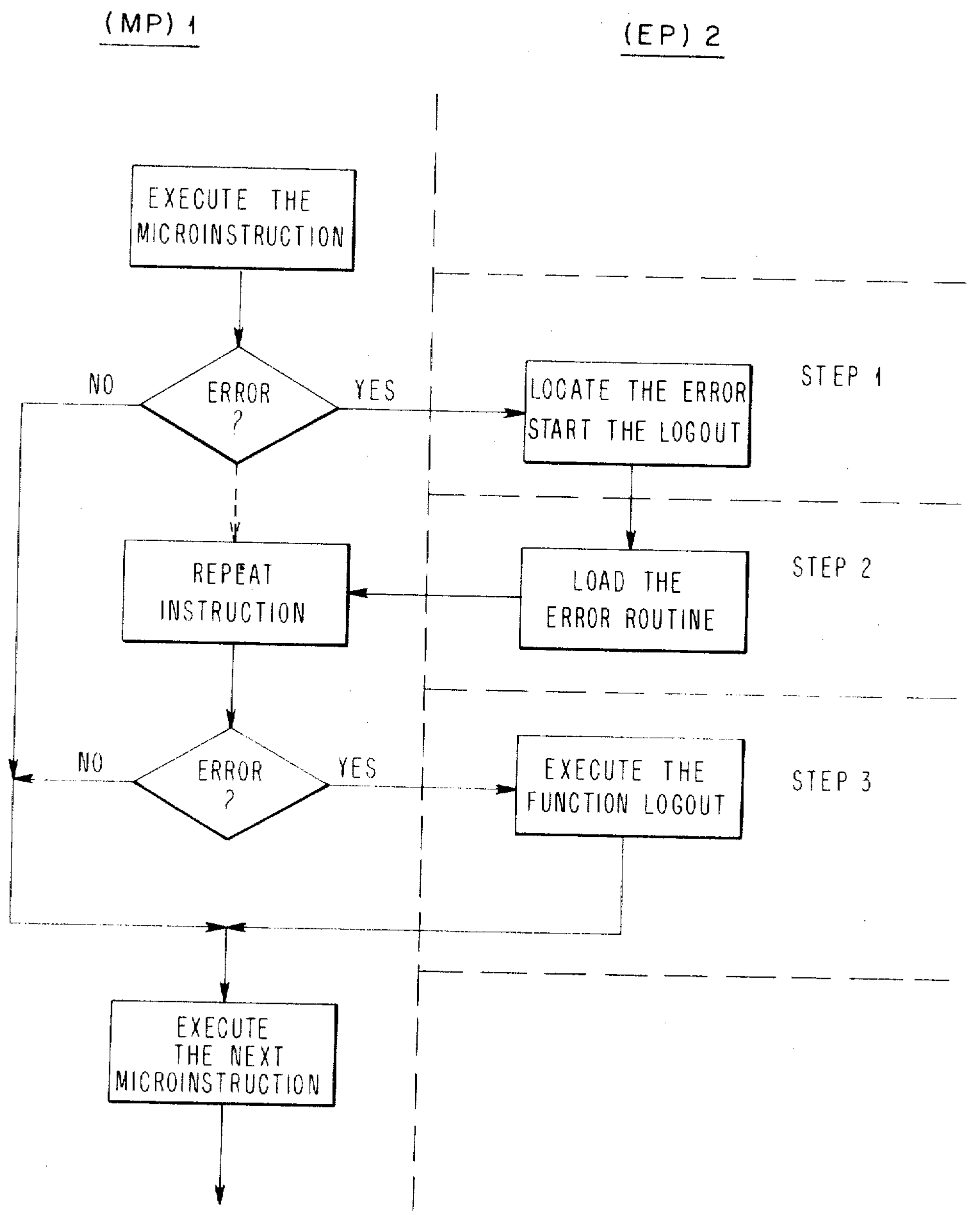
FIG. 2 is a flow diagram of the data processing system in accordance with FIG. 1.

This addressing method is hereafter described by proceeding from the assumption that an error has occurred in the arithmetic and logical unit (ALU) 41 of FIG. 3A. Error processing system 2 continuously checks the main processing system 1 in accordance with the diagram shown in FIG. 2. For the worst cases of error, this diagram provides three process steps between the execution of one microinstruction and the next to form the correct result of a microinstruction. After execution of a microinstruction, a check is made to determine whether an error has occurred. If not, the next microinstruction is executed by the main processing system as shown in FIG. 2. Alternatively, if an error has occurred, the error processing system, in its first step, will detect the source (within the main processing system) of the error. In addition, in this first step, an error logging routine, the so-called LOG routine, is initiated for future system maintenance and purposes of error statistics. In step 2 the error routine is loaded into the error processing system from disk storage 3 (FIG. 1) and the instruction is initially repeated by the main processing system. If the subsequent check indicates a correct result, the next microinstruction is executed. Alternatively, if the result continues to be identically wrong, the error processing system proper, in addition to the LOG routine, performs the erroneous function in step 3. At the end of step 3, the correct result is fed into main processing system 1 (for example, as mentioned, into result register (RR) 42 of FIG. 3A). Subsequently, the next microinstruction is executed, error checks being made between the execution of this and the succeeding microinstruction.

For executing process step 1 of error processing system 2, address information is fed to main processing system 1 via address bus AB to interrogate the outputs of the different check circuits with a view to determining where in the main processing system errors have occurred. The address information transferred via address bus AB is fed to a decoder (DEC) 31 (FIG. 3B) which decodes the address information and generates gate control signals for gates 46 and 47 (FIG. 3B) and for gate 51 (FIG. 3A). While the gate control signals for gates 46 and 47, via control cables 49 and 48, are directly transferred to inputs *a*,*b*,*c*,*d* . . . which are designed as AND circuits, the control signal for gate 51 is transmitted indirectly via AND circuit 37 (FIG. 3A).

As is shown in FIGS. 3A and B, gates 46, 47, 50 and 51 each consists of a combination of AND circuits & with one OR circuit O, the outputs of the AND circuits simultaneously serving as inputs to the connected OR circuit. The inputs of said gates, which are designed as AND circuits, are provided in general with two inputs, one being controlled, as mentioned above, by the output signals of decoder 31. The remaining input to an AND circuit is from various other points within the system structure, for example, from the outputs of check circuits 43 to 45 and from certain outputs of function decoder (F-DEC) 36, since, in addition to the correct operation of the registers and functional units, function decoder 36 has to be checked to determine that it is free from errors and whether the selected function is the required one.

For carrying out the first step in the work sequence of the error processing system 2, addresses are consecutively transmitted to the main processing system via address bus AB. These addresses, which are decoded in decoder 31, successively supervise the outputs of check circuits 43 to 45 and the output of function decoder 36. During the latter process, the following circuits are active:

- decoder 31,
- gate 46 with the inputs in the order *a*,*b*,*c*, and *g*,
- gate 47 with its input *a*.

As it was assumed that an error occurred in the arithmetic and logical unit (ALU) 41, check circuit (CH) 45 is also active.

Only in the case of an active check circuit are further outputs of registers interrogated by error processing system 2. Which of the registers are interrogated depends in each case upon which check circuit has been activated. In the case of an error of the arithmetic and logical unit 41, the following additional data are interrogated:

- the contents of register (CDR) 39, containing operand B, via gate 46, input *f;*
- the contents of register (TDR) 38, containing operand A, via gate 46, input *e;*
- the output of arithmetic unit (ALU) 41 via gate 46, input *d;*
- the output signal pattern of function decoder (F-DEC) 36 for the erroneous function via gate 46, input *g*.

The output signal pattern of function decoder 36 is transferred to gate 46 via line group 52, the number of lines in the group corresponding to the number of signal pattern bits to be transmitted in parallel. For simplicity's sake, this group of lines is represented as a single line in FIGS. 3A and B. Input *g* of gate 46 is also shown in simplified form. Its function for transferring the output signal pattern of function decoder 36 is such that upon input *g* being energized by decoder 31 the full output signal pattern of the function decoder is transmitted to input *a* of gate 47.

Via gate 47, whose design is similar to that of gate 46, said data, in the first processing step of error processing system 2, are transferred to data bus DB which links the main processing system with error processing system 2.

Data bus DB, as is shown in FIG. 1, extends beyond gate 47 and its input *f*. The contents of operation register (OPR) 35 after having been conditioned by decoder 31 is transferred to data bus DB via input *e* of gate 47. Inputs *b* to *d* of this gate are available for further operations which are of no interest in this connection.

During step 1 of the work sequence of the error processing system an error logging routine, the so-called LOG routine, is initiated, as has been mentioned above.

In the manner described above, the data essential for carrying out the subsequent process steps 2 and 3 could be entered into error processing system 2. The latter thus contains all necessary data to perform any further process steps. The data flow ensuring the necessary data during the first process step is readily detectable from the heavy lines in FIGS. 3A and B.

Figure 4A:
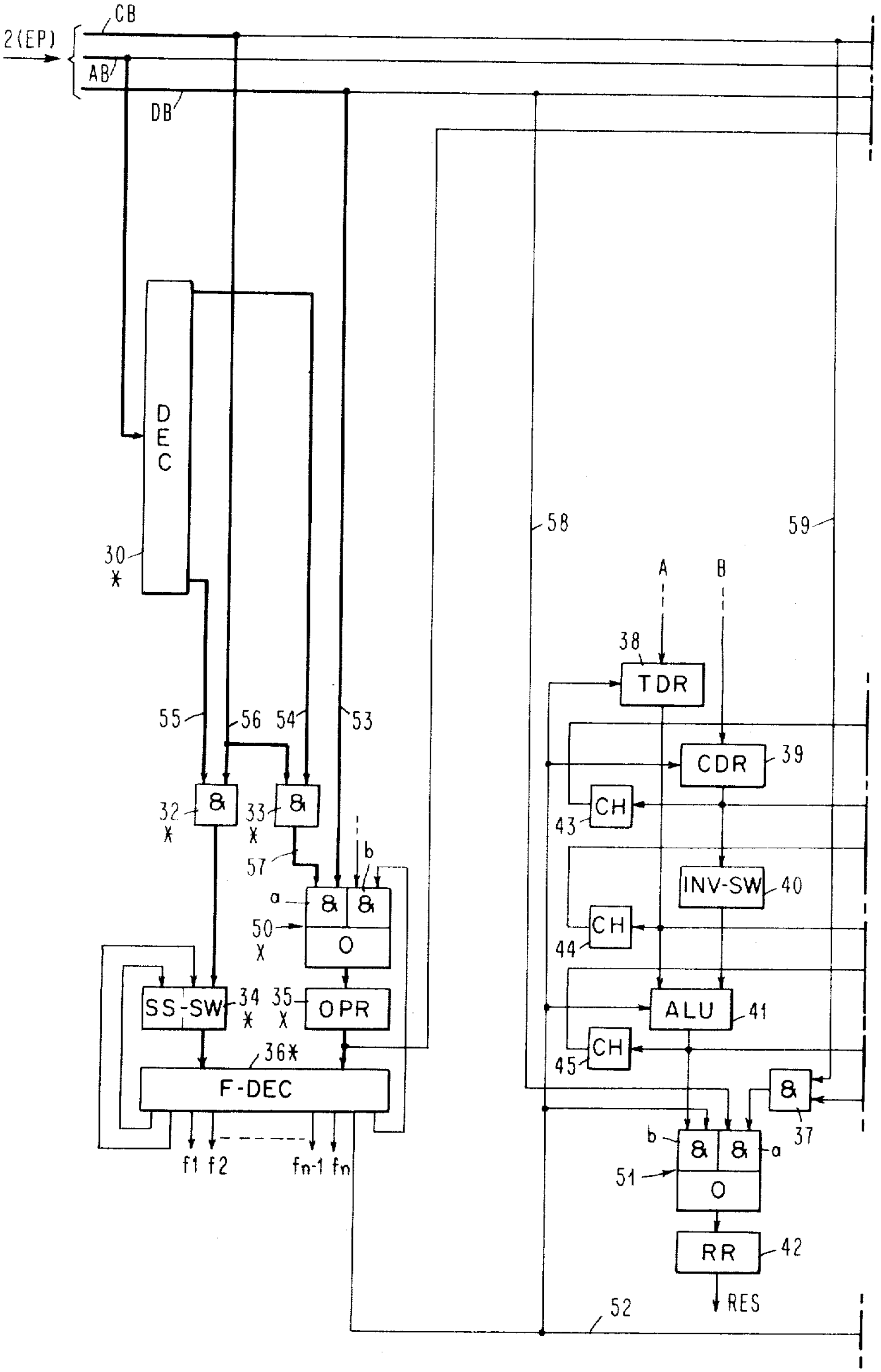
Figure 4B:
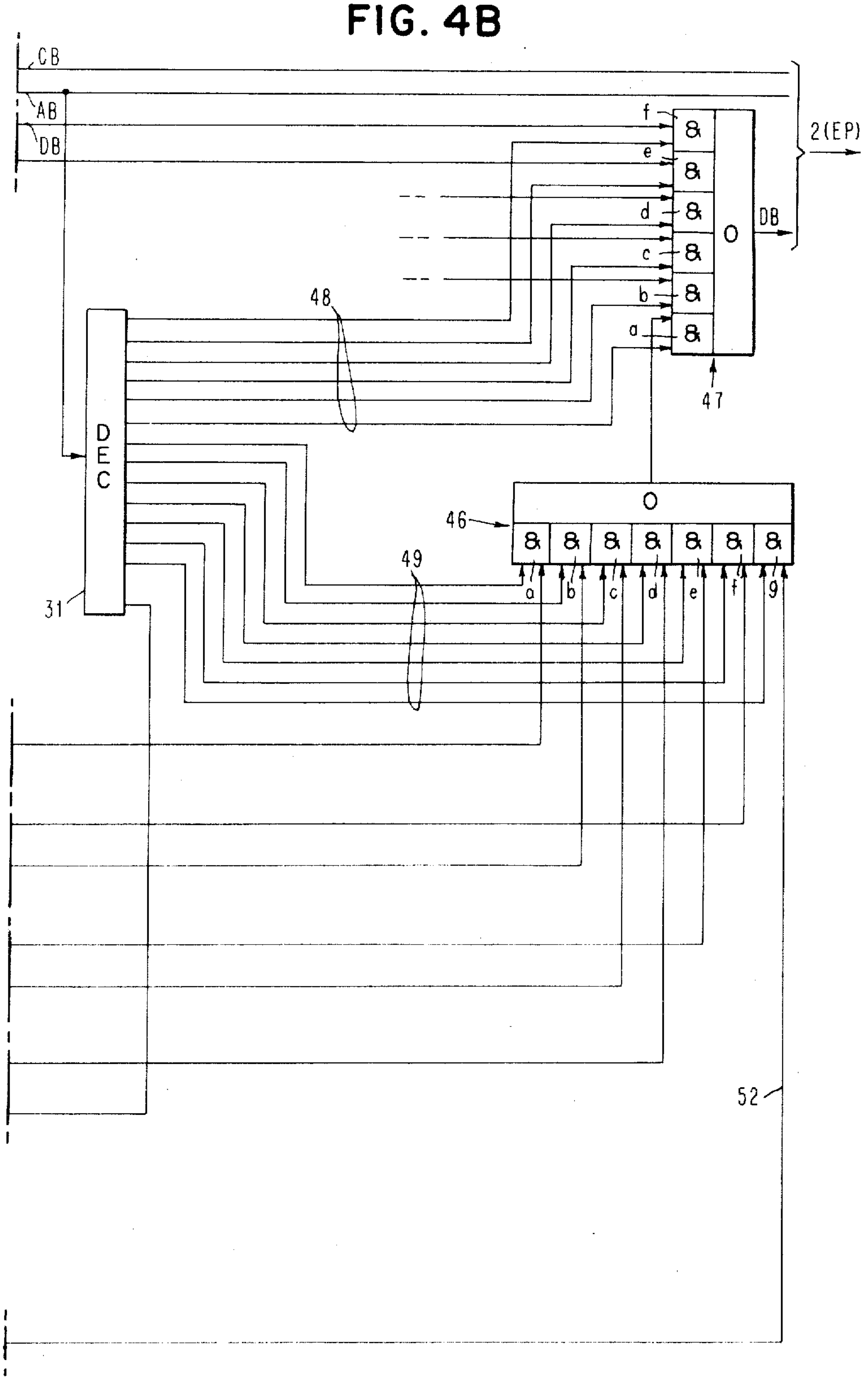

During the second step, the error routine is loaded. The processes involved are illustrated in FIGS. 4A and B which are essentially similar to FIGS. 3A and B, showing in heavy lines those conductors which participate in this step. The registers and functional units which participate in this step are identified by an asterisk (*) appearing next to their reference numerals.

The second step is initiated in that the contents of operation register (OPR) 35 of the main processing system 1 are reloaded. To this end, the corresponding information is transferred to the operation register via data bus DB, line 53 and input a of gate 50 preceding operation register 35. Input *a* of gate 50 is selected by address information which is transferred from the error processing system via address bus AB. Decoder 30 decodes this address, generating an output signal on line 54, which is transmitted to AND circuit 33. A further gate control signal for this AND circuit 33 is supplied by control bus CB via line 56. This means that the information destined for operating register 35 is transferred from data bus DB to this register as soon as the address for input a of gate 50 and a control pulse on line 56 are available.

Subsequently, the main processing system is restarted in that start stop switch (SS-SW) 34 is set "on" which applies a corresponding control signal to function decoder 36.

Start stop switch 34, which in the preferred embodiment is designed as a flip flop, is set on by supplying its associated address and by simultaneously transferring a control signal from control bus CB. The address of this start stop switch 34 is transmitted from error processing system 2 to main processing system 1 via address bus AB. Decoder 30 decodes this address, supplying on its output line 55 a control signal to enable AND circuit 32. This circuit then emits an output signal for setting on start stop switch 34 when a control signal on its other input is simultaneously transmitted from control bus CB via line 56.

Having received the output signal of start stop switch 34, function decoder 36 generates further gate control signals on its outputs *fl* to *fn* which are necessary to repeat previous erroneous instructions.

The diagram of FIG. 2 shows that following an instruction retry in step 2 a further error check is made which may be the same as or similar to that described in connection with step 1. If this error check shows that the same error or errors are still present, error processing system 2 enters its third processing step. In accordance with FIG. 2, this step consists in error processing system 2 carrying out the erroneous function and initiating the LOG count.

It is assumed that the same error is still present in the arithmetic and logical unit (ALU) 41. In such a case, the error check will show that check circuit (CH) 45 is active. Error check system 2 then carries out the same scanning operations or invocations as have been described in connection with FIGS. 3A and B to obtain the error and source data required for computing the correct result. In the case of an error of the arithmetic and logic unit 41, the output information of the latter is transferred, via input *d* of gate 46 and thence, via input *a* of gate 47, to data bus DB which transmits this information to the error processing system. In addition, the contents of registers 38 and 39 are transferred to the error processing system via gates 46 and 47. In the error processing system the error data are compared, and in the case of an identical error, the correct result is generated.

Figure 5A:
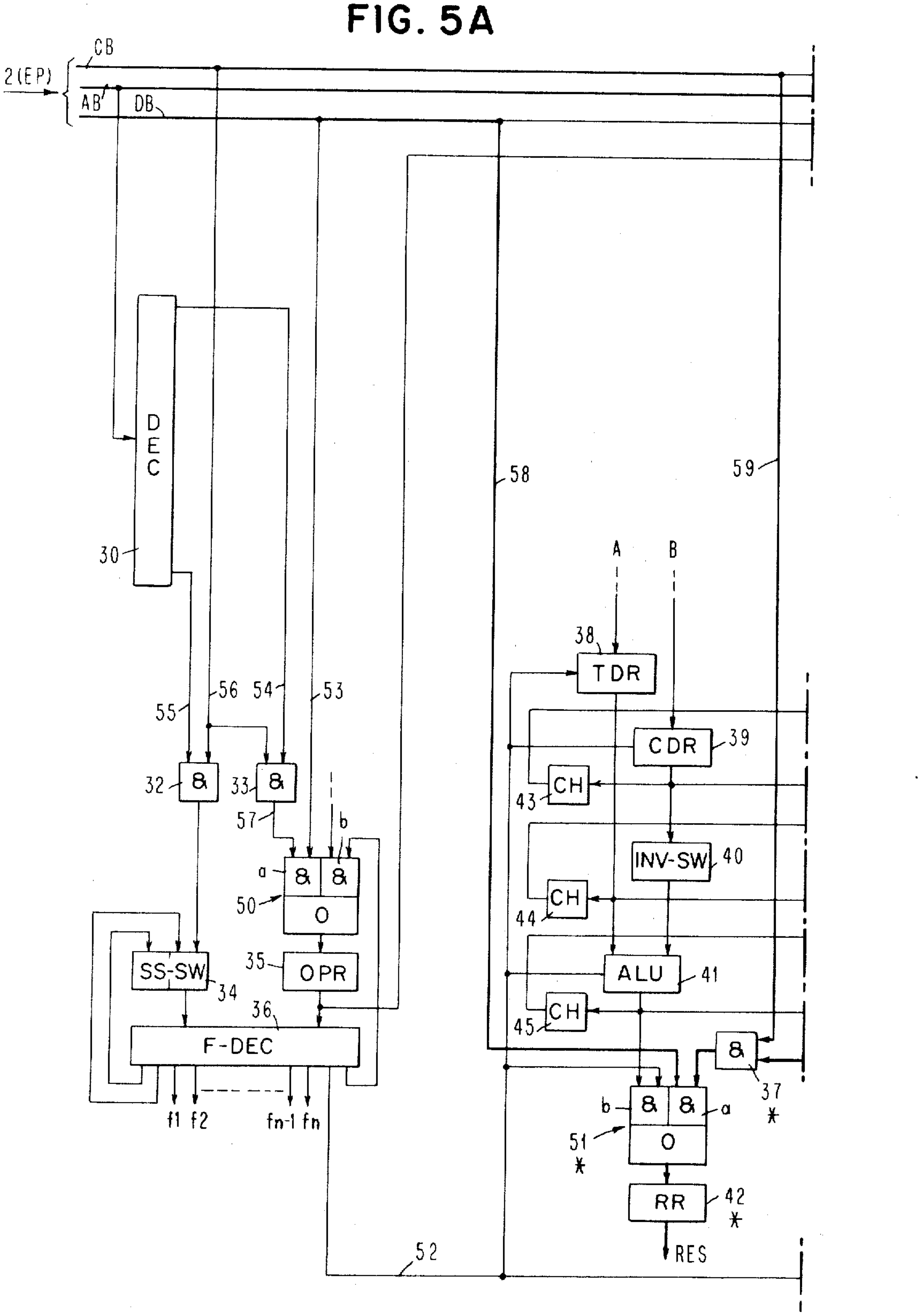
Figure 5B:
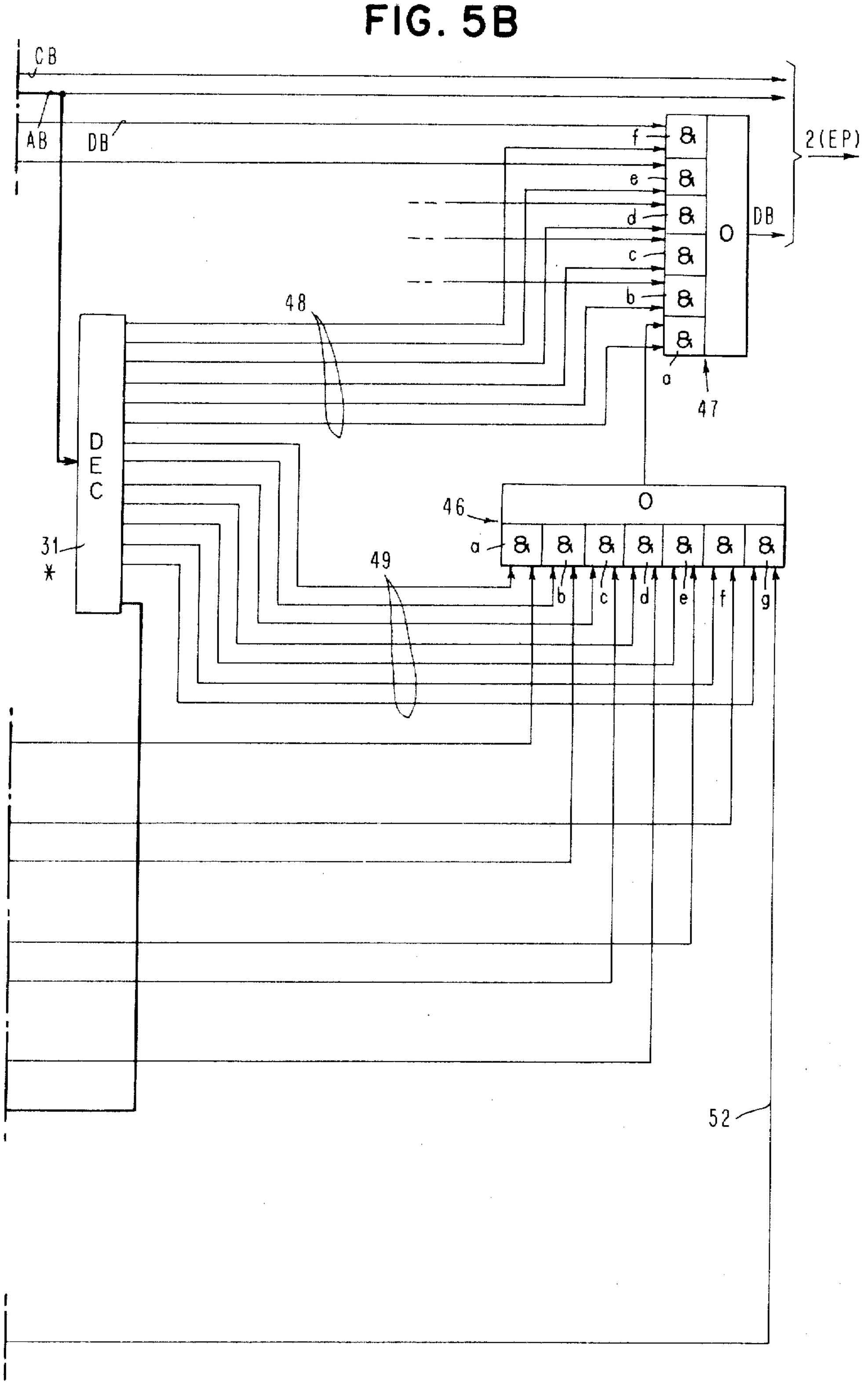

Subsequently, the result determined is returned to result register (RR) 42 of main processing system 1. This operation is illustrated by the data flow shown in heavy lines in FIG. 5A. FIGS. 5A and B as well as FIGS. 4A and B correspond to FIGS. 3A and B. Via data bus DB, the correct result is transferred from error processing system 2 to main processing system 1. Line 58 leads from data bus DB to input a of gate 51 preceding result register 42. The correct result can only be transferred to result register 42 when the second control signal is available on input a of gate 51. This second control signal is an output signal of AND circuit 37 and is available upon a control signal being emitted via input line 59 from control bus CB and upon an addressing signal of decoder 31 being applied to input line 60. Said decoder generates this signal when decoding the address information which has been transferred via address bus AB in the usual manner.

Figure 6:
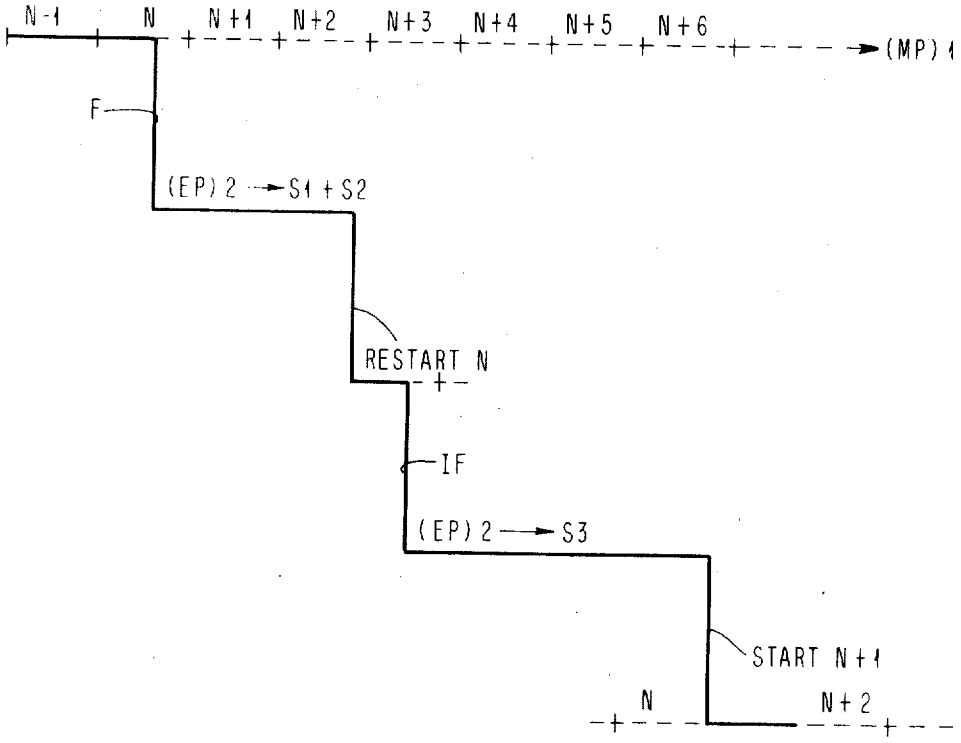
FIG. 6 is a diagram representing the work cycles of the data processing system in accordance with FIG. 1 in the case of an error.

FIG. 6 serves to show the reduction in speed of the data processing system described when an error has occurred. The upper line of this figure shows a part of the processing cycles (N−1) to N+6 of main processing system (MP) 1. FIG. 6 shows that the main processing system has terminated processing cycle (N−1) and is now engaged in cycle N. Before the latter cycle is completed, error processing system (EP) 2 detects an error F. The error processing system then performs process steps 1 and 2 (S1+S2). At the end of step 2, main processing system 1 is restarted to carry out processing cycle N. In the example in accordance with FIG. 6 it is assumed that error processing system 2 again detects an error IF which is identical to the first. In such a case the system commences its third step (S3). Error processing system 2 computes the correct result, transferring the latter to main processing system 1 and starting said system for the next cycle N+1, since the function associated with cycle N has already been executed, although at a speed which is essentially lower than that of main processing system 1. In this manner, error processing system 2 intercepts the operation of the main processing system in the casse of an error and performs the function that the main processor was unable to execute.

While the invention has been particularly shown and described with reference to a preferred embodiment thereof, it will be understood by those skilled in the art that various changes in form and details may be made therein without departing from the spirit and scope of the invention.

What is claimed is:

1. An electronic data processing system comprising:

a main processing system which includes registers, functional units for executing functions, and error check circuits for indicating the occurrence of errors within said system;

a function simulation processing system for simulating functions performed by said functional units;

a bus system linking both of said processing systems;

said function simulation processing system comprising:

supervising means connected through said bus sytem to said check circuits for identifying, in the case of an error, the particular functional unit which produced said error;

means for storing source information received via said bus system from the registers in said main processing system which supply data to said particular functional unit, means for operating upon said source information to produce a correct result by simulating the function of the functional unit which produced said error, and means for transferring said correct result via said bus system to said main processing system.

2. The electronic data processing system of claim 1 wherein:

said supervising means comprises addressing means connected to said check circuits through an address bus within said bus system for identifying, in the case of an error, the check circuit which signalled the occurrence of said error.

* * * * *